Patented May 27, 1952

2,598,108

UNITED STATES PATENT OFFICE 2,598,108

DEHYDRATION OF CASTOR OIL

Ronald James Carter and Mary Bristow, Slough, England, assignors to Imperial Chemical Industries Limited, a corporation of Great Britain No Drawing. Application January 6, 1950, Serial No. 137,268. In Great Britain January 10, 1949

4 Claims. (Cl. 260—405.5)

This invention relates to the catalytic dehydration of castor oil.

Castor oil consists mainly of the triglyceride of ricinoleic acid. The ricinoleic acid chains of the triglyceride each contains one double-bond and one hydroxyl group and as a result the oil has little or no drying properties. It is well known that the removal of the hydroxyl group and an adjacent hydrogen atom as water introduces a second double bond into the acid chain, and the dehydrated oil so produced has drying properties which render it extremely useful in the manufacture of paints and varnishes.

The dehydration process is carried out at an elevated temperature and the effect of heat on the dehydrated product is to cause polymerisation and ultimately gelation of the oil. Consequently in order to make a dehydrated oil which is little polymerised as possible i. e. of the lowest possible viscosity, it has been found desirable to work at a temperature of 250–300° C. and in the presence of a substance which will catalyse the dehydration process. Many such catalysts have been described and in particular the use of acid compounds such as phosphoric acid, sulphuric acid, sulphonic acids of aromatic hydrocarbons, acid esters and acid salts of the aforesaid mineral acids is proposed in U. S. P. 1,892,258.

A further effect of this heat-treatment involved in the dehydration process is to cause darkening of the oil, and this is undesirable from the paint and varnish manufacturers' point of view since, in order to produce clean white and pastel-coloured paints, the pigments should be dispersed in a pale varnish. It is known that when sulphuric acid is used as the catalyst the initially dark product becomes paler on prolongation of the heat-treatment, but the prolonged heat-treatment also causes polymerisation to take place with a resultant increase in the viscosity of the dehydrated oil.

We have now found that whilst all the above-mentioned acid compounds effectively catalyse the dehydration of castor oil, ortho-phosphorous acid is remarkably superior in that the oil heated in its presence is much paler in colour than oil heated in the presence of other acid catalysts.

Moreover we have found that when the dehydration is carried out in the presence of known dehydration catalysts then provided ortho-phosphorous acid is also present during the reaction the product is again paler in colour.

The ortho-phosphorous acid is present in amount between 0.1 and 1.0% of the oil.

The improvement in colour is particularly apparent in dehydrated oils with a viscosity of 2–3 poises since the relatively high temperature and catalyst concentrations which are of necessity involved in this manufacture normally promote the objectionable discolouration of the oil.

According to the present invention a process for the dehydration of castor oil comprises heating the oil in the presence of ortho-phosphorous acid.

The invention is illustrated by reference to the following.

A series of dehydrated castor oils was made by a process in which a known proportion of catalyst was slowly added with stirring to raw castor oil, the temperature of the mixture then being raised within 15–20 minutes to 275° C. The mixture was held at this temperature under a reflux condenser fitted with a receiver to collect the water evolved during the reaction. The oil was then cooled and certain of its constants were measured. These together with the proportion of catalyst used and the time of reaction at 275° C. are set out in the table below:

| Expt. | Catalyst | Percent used | Mins. at 275° C. | Dehydrated oil constants ||||
|---|---|---|---|---|---|---|---|
| | | | | −OH value | Acid value | Colour | Viscosity |
| 1 | p-Toluene, sulphonic acid | 0.4 | 25 | 21.0 | 51.9 | 8 | 2.1 |
| 2 | Sulphuric acid | 0.4 | 25 | 24.2 | 14.3 | 3½ | 2.2 |
| 3 | Phosphoric acid | 0.5 | 46 | 36.0 | 8.9 | 2½ | 2.3 |
| 4 | O-phosphorous acid | 0.5 | 43 | 23.8 | 8.7 | ¾ | 2.2 |
| 5 | {Sulphuric acid / O-phosphorous acid} | 0.2 / 0.4 | 25 | 30.1 | 14.6 | ⅛ | 2.1 |
| 6 | {Sulphuric acid / Phosphorous acid} | 0.4 / 0.4 | 25 | 16.9 | 13.4 | 1½ | 2.2 |

The —OH value, mgms. KOH/gm., was determined using the method described in Paint Research Station technical paper No. 95 (1938).

The acid value is expressed in mgms. KOH/gm. The colour of the samples was measured on the Paint Research Station scale. The viscosity is expressed in poises at 25° C.

The reaction temperature, reaction time and catalyst concentration in this series of experiments were chosen so as to produce low viscosity dehydrated castor oil and the figures given in the table emphasise the effect of ortho-phosphorous acid on the colour of the dehydrated oil.

The oils were subsequently made up into long-oil alkyd resins and the advantage in colour of the ortho-phosphorous acid catalysed oil was found to be fully imparted to the final resinous product. The use of this new catalyst does not appear to affect the drying rates of varnishes made up from the oil-modified alkyd.

Having now particularly described and ascertained the nature of our said invention and in what manner the same is to be performed, we declare that what we claim is:

1. A process of dehydrating castor oil which comprises heating castor oil in the presence of ortho-phosphorous acid.

2. A process of dehydrating castor oil which comprises heating castor oil in the presence of a mixture of ortho-phosphorous acid and another acidic catalyst for the dehydration reaction.

3. A process of dehydrating castor oil which comprises heating castor oil in the presence of a mixture of ortho-phosphorous acid and sulphuric acid.

4. A process according to claim 1 in which the ortho-phosphorous acid is present in amount between 0.1 and 1.0% of the oil.

RONALD JAMES CARTER.
MARY BRISTOW.

REFERENCES CITED

The following references are of record in the file of this patent:

UNITED STATES PATENTS

| Number | Name | Date |
| --- | --- | --- |
| 1,892,258 | Ufer | Dec. 27, 1932 |